J. MICHKI & J. TOTH.
DIRIGIBLE HEADLIGHT.
APPLICATION FILED AUG. 7, 1911.

1,004,454.

Patented Sept. 26, 1911.

2 SHEETS—SHEET 1.

Witnesses

Inventors
Joseph Michki
Joseph Toth

J. MICHKI & J. TOTH.
DIRIGIBLE HEADLIGHT.
APPLICATION FILED AUG. 7, 1911.
1,004,454.
Patented Sept. 26, 1911.
2 SHEETS—SHEET 2.
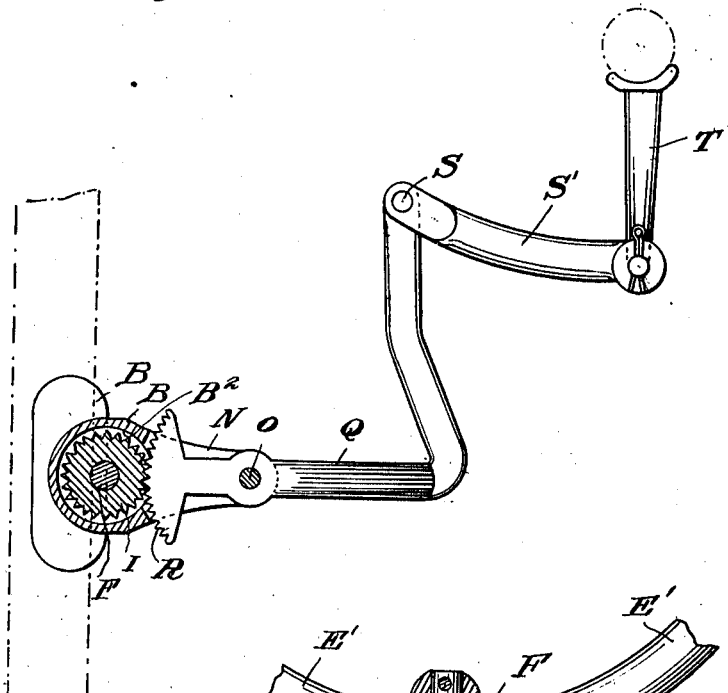
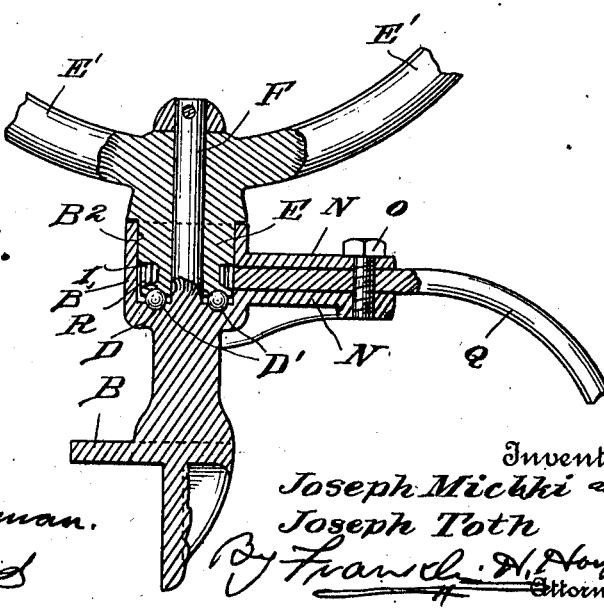

UNITED STATES PATENT OFFICE.

JOSSEF MICHKI AND JOSEPH TOTH, OF TERRE HAUTE, INDIANA.

DIRIGIBLE HEADLIGHT.

1,004,454.   Specification of Letters Patent.   Patented Sept. 26, 1911.

Application filed August 7, 1911.   Serial No. 642,618.

*To all whom it may concern:*

Be it known that we, JOSSEF MICHKI and JOSEPH TOTH, citizens of the United States, residing at Terre Haute, in the county of Vigo and State of Indiana, have invented certain new and useful Improvements in Dirigible Headlights; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatically operated searchlight holders and affords a simple and efficient means whereby the rays of light from the lamp may shine upon the track to be followed by the wheels of a vehicle.

The invention consists of various details of construction and combinations and arrangements of parts which will be hereinafter fully described and then specifically defined in the appended claims.

We illustrate our invention in the accompanying drawings, in which:—

Figure 1:
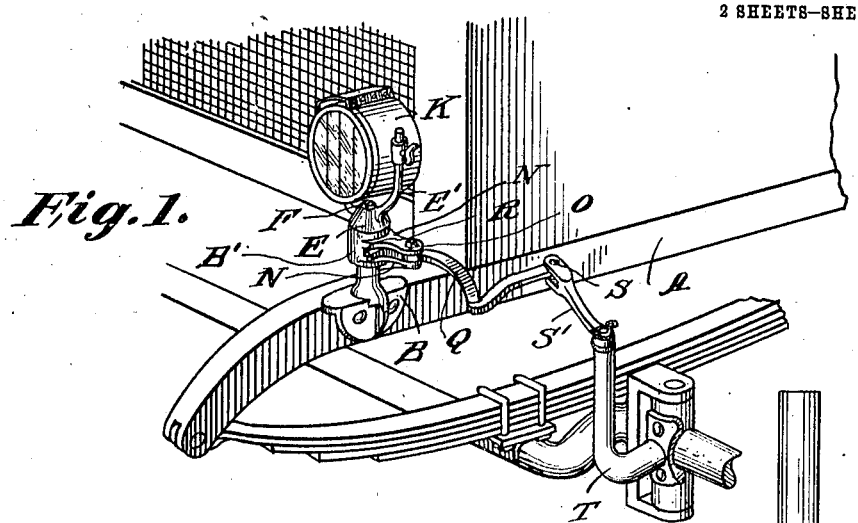
Figure 2:
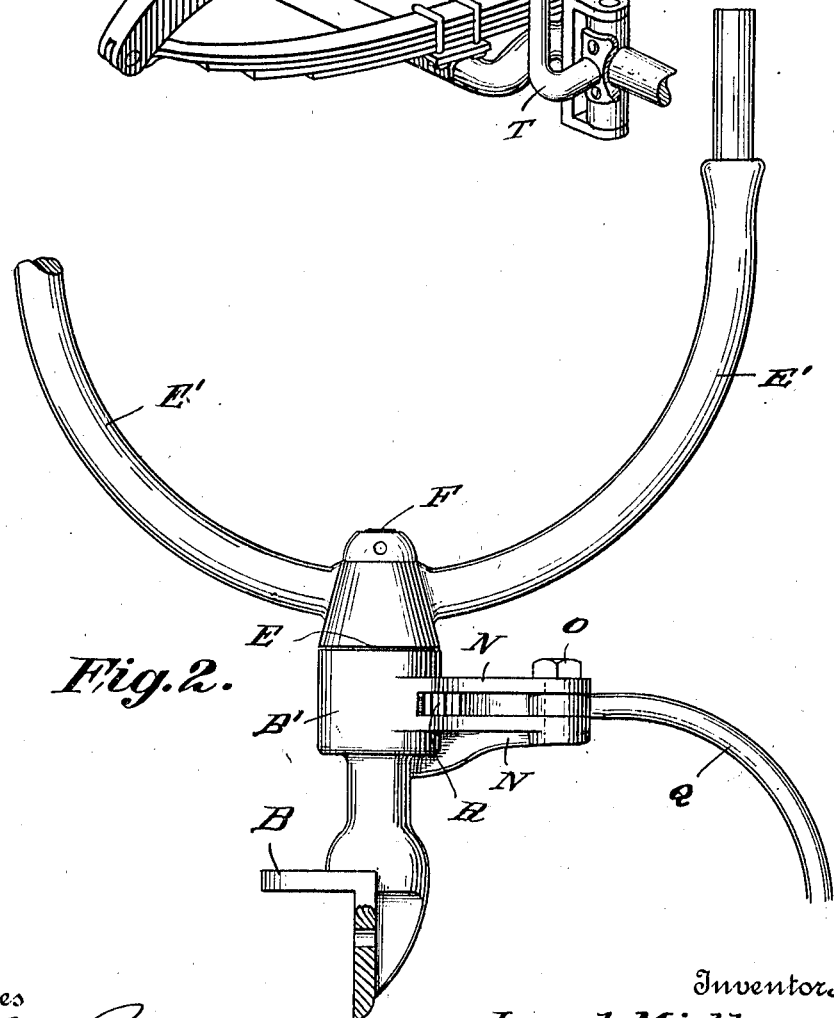

Figure 1 is a perspective view showing the application of the invention to the truck of an automobile. Fig. 2 is an enlarged detail view of the lamp holder. Fig. 3 is a sectional view transversely through the head of the holder showing the gear connections between the pinion upon the head and a gear lever, and Fig. 4 is a vertical sectional view through the head.

Reference now being had to the details of the drawings by letter, A designates the truck of an automobile to which the angled bracket B of the head B' is adapted to be bolted or otherwise securely held. Said head has a socket portion $B^2$ in its upper end, the bottom of which is provided with an annular groove D in which a series of ball bearings D' is mounted. An integral pin F rises from the bottom of said socket member and forms a vertical bearing for the hollow shank portion E of the forked member having arms E' adapted to support a lamp K. Secured to or integral with the shank portion E is a pinion wheel I, and projecting from the head $B^2$ are the arms N which are spaced apart and which carry in registering apertures a pivotal screw O.

Q designates an angle lever having an aperture for the reception of the pivotal pin O and one end of said lever has a series of segment teeth R formed therein adapted to mesh with the teeth of said gear wheel for the purpose of rocking the member carrying the lamp. Said angle lever Q is pivotally connected by means of a pin S with the forked end of a link S' which in turn is pivotally connected to the bracket arm T which latter is bolted or otherwise secured to the axle or steering gear of the machine.

The operation of our invention is as follows: The parts being adjusted as shown, when the flaring wheels are turned by the operator actuating the steering mechanism, will cause the angle lever to turn upon its pivot and the rack teeth thereon cause the gear wheel to make a partial revolution and in turn cause the arms carrying the lamp to swing so that the rays of light from the lamp will point in the direction of the vehicle.

While we have shown our device as applied to one side of the vehicle, it will be equally applicable to either the right or left side with slight variations of the shape of the levers and connections.

What we claim to be new is:—

1. An automatically operated searchlight for vehicles comprising a bracket member adapted to be fastened to the truck of a vehicle having a hollow shank portion with an annular groove in the bottom thereof, ball bearings in said groove, a pin rising centrally from said bottom, a forked member upon which a lamp is adapted to be held and provided with a shank portion having a bearing in said socket, a gear wheel rotating with said shank portion and forked member, bracket arms projecting from said socket member and spaced apart, a lever pivoted between said bracket arms and in mesh with the teeth of the gear wheel, and pivotal link connections between said lever and the steering apparatus of the vehicle.

2. An automatically operated searchlight for vehicles comprising a bracket member adapted to be fastened to the truck of a vehicle having a hollow shank portion with an annular groove in the bottom thereof, ball bearings in said groove, a pin rising centrally from said bottom, a forked member upon which a lamp is adapted to be held and provided with a shank portion having a bearing in said socket, a gear wheel rotating with said shank portion and forked member, bracket arms projecting from said socket member and spaced apart, a pivotal screw mounted in registering apertures in said bracket arms, an angle lever pivotally mounted upon said screw and having a widened end with serrations therein guided between the bracket arms and in mesh with said gear wheel, and pivotal link connections between said lever and the steering gear of a vehicle.

In testimony whereof we hereunto affix our signatures in the presence of two witnesses.

JOSSEF MICHKI.
JOSEPH TOTH.

Witnesses:
WILLIAM SHANE,
SIG SIMAN.

Copies of this patent may be obtained for five cents each, by addressing the "Commissioner of Patents, Washington, D. C."